May 26, 1931. P. C. RAYMOND 1,806,707
MACHINE TOOL FOR TAPPING NUT BLANKS
Filed June 23, 1928 2 Sheets-Sheet 1
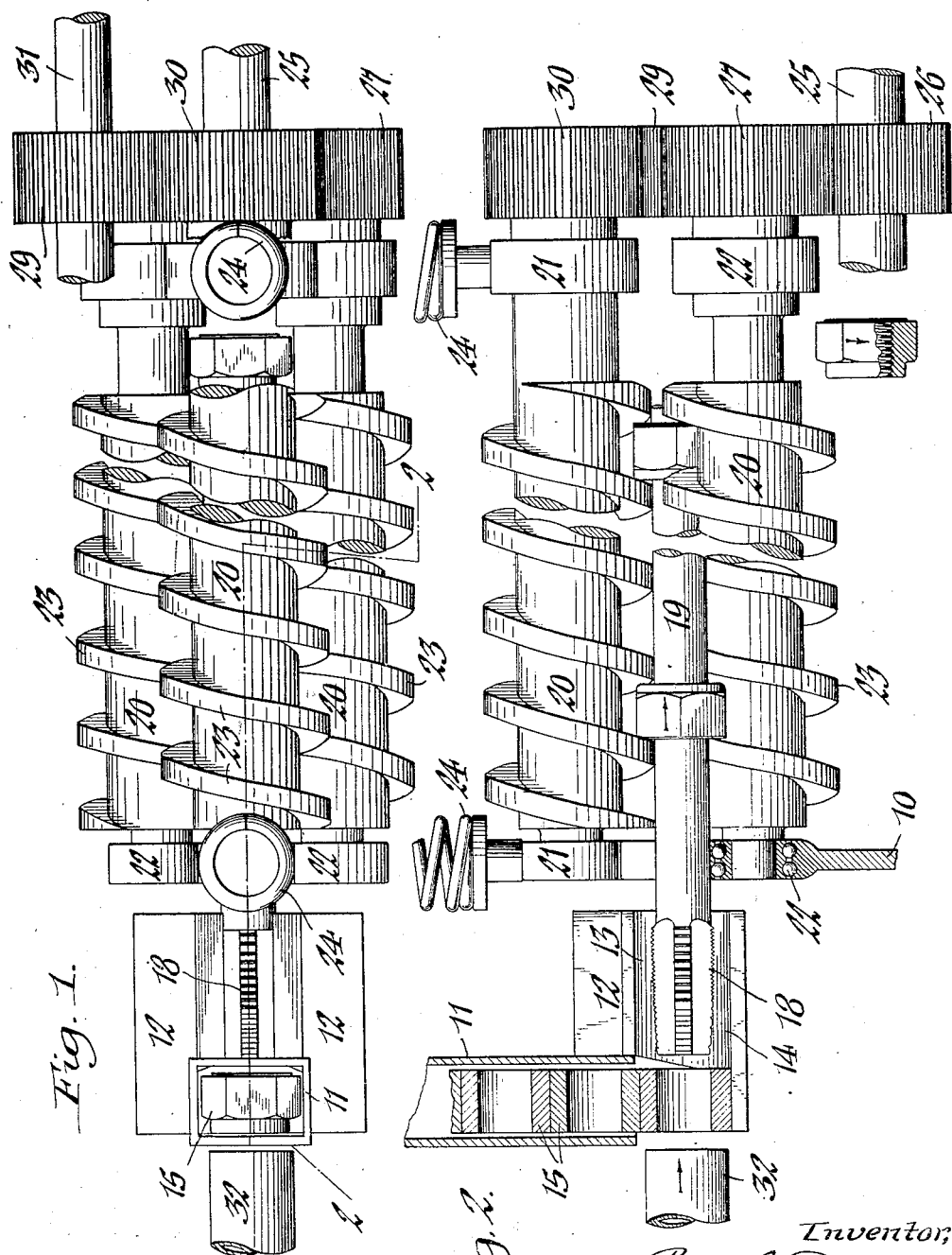

May 26, 1931. P. C. RAYMOND 1,806,707
MACHINE TOOL FOR TAPPING NUT BLANKS
Filed June 23, 1928 2 Sheets-Sheet 2
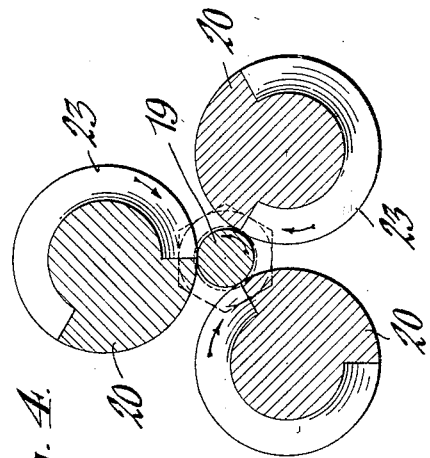
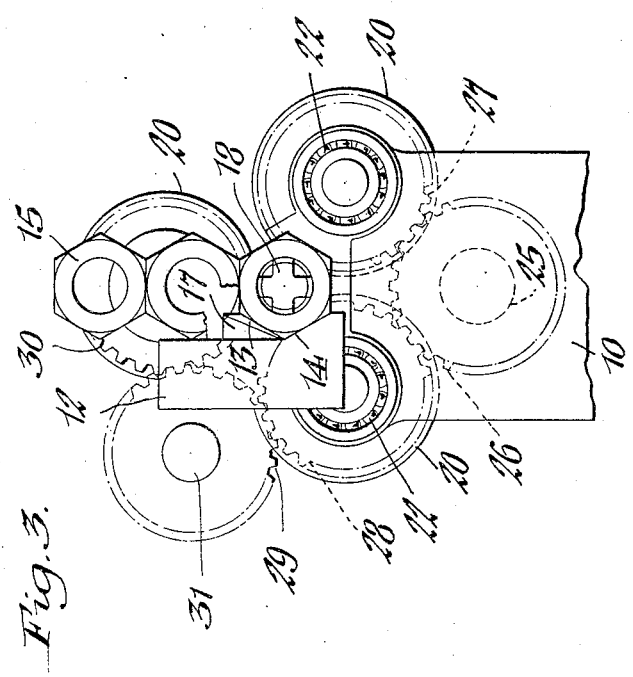
Inventor,
Paul C. Raymond,
by Geyer & Geyer
Attorneys.

Patented May 26, 1931

1,806,707

UNITED STATES PATENT OFFICE

PAUL C. RAYMOND, OF BUFFALO, NEW YORK

MACHINE TOOL FOR TAPPING NUT-BLANKS

Application filed June 23, 1928. Serial No. 287,763.

This invention relates to improvements in machine tools for tapping nut-blanks.

Its chief object is the provision of a tool of this character having simple, compact and novel means for driving the tapping tool and simultaneously feeding the work along the tool to the discharge end thereof.

Another object of the invention is to provide a nut-tapping tool which is reliable and efficient in operation, which is composed of few parts, and which requires a minimum expenditure of power to operate it.

In the accompanying drawings:—

Figure 1 is a top plan view of a machine tool embodying my invention. Figure 2 is a sectional side elevation taken substantially in the plane of line 2—2, Figure 1. Figure 3 is a front end view of the same. Figure 4 is a transverse section on line 4—4, Figure 1.

Similar characters of reference indicate corresponding parts throughout the several views.

The various working parts of my improved tool are mounted in a suitable frame, a portion of which is indicated at 10, said parts comprising, generally, a chute for introducing the nut-blanks to the machine, a set of jaws for holding the blanks while being tapped, a revolving tap having a stem thereon over which the finished nuts are guided during their progress through the machine, and a plurality of driving or feed rolls contacting with the tap-stem for turning it and for propelling the tapped nuts toward the discharge end of the machine where they drop by gravity into a suitable receptacle provided for receiving them.

The chute 11, which may be rectangular in cross section, rises from the front end of the machine and opens at its lower end immediately in advance of a pair of jaws 12, 12 having opposing inclined walls 13, 14 for receiving the side faces of the nut blanks 15 between them in the manner shown in Figure 3. The upper inclined jaw-walls 13 overhang the lower ones and the front ends 17 of such walls constitute a guard for preventing the nut-blanks tipping over as they approach the base plate in line with the opening between the jaws.

Extending centrally into the space between the jaws 12, 12 is a horizontally disposed tap 18 for cutting threads in the nut-blanks 15. The tap-stem 19, which is comparatively long, is supported and driven by a plurality of feed screws or spirally-grooved rollers 20 arranged about the stem and journaled at their ends in bearings 21, 22 provided in the frame 10. As shown in the drawings, three of such feed screws are preferably provided, two being disposed alongside each other below and on opposite sides of the axis of the tap, while the third one is located above and in axial line with said tap, whereby the latter is reliably supported against displacement at three substantially equi-distant points. The threads 23 of these feed screws extend in the same direction and are of the same pitch and in line with one another. The bearings 21 of the upper feed screw are free to slide vertically in the frame and coil springs 24 applied to the upper sides thereof serve to urge such screw into frictional contact with the upper side or the tap-stem 19.

Motion is transmitted to the feed screws in any appropriate manner, that shown in the drawings by way of example, consisting of a driving shaft 25 located axially below the tap-stem and having a gear 26 thereon meshing with similar gears 27, 28 applied to the rear ends of the lower feed screws. The gear 28 meshes with an idler gear 29, which in turn meshes with a gear 30 applied to the corresponding end of the upper feed screw. These gears are all of the same diameter so that the feed screws are driven at a uniform speed, the idler gear 29 being fixed on a shaft 31 journaled in bearings on the machine-frame.

Any suitable means may be employed for projecting the nut-blanks 15 successively onto the tap 18. For example, a reciprocating plunger 32 may be used, which is disposed in axial alinement with the tap and so timed as to push one of the nut-blanks onto the latter at predetermined intervals. The plunger shown in the drawings is hollow to receive a cooling fluid which plays over the tap during the threading of the nut-blanks and which also assists in projecting the tapped nuts rearwardly onto the stem 19 of the tap and into the grooved spaces between the three feed screws. When the nuts reach the latter they are fed thereby rearwardly along the stem of the tap from which they drop by gravity into a suitable receptacle.

While this tool has been shown in connection with the tapping of nuts, it is to be understood that it is likewise applicable for drilling, reaming and milling operations.

I claim as my invention:—

1. A nut tapping machine tool, comprising a frame, a tap having a comparatively long stem portion projecting from one end thereof, a plurality of spirally-fluted feed screws journaled in said frame and in frictional peripheral contact with substantially the overall length of the tap-stem, two of said feed screws being disposed side by side in horizontal alinement and between the upper opposing sides of which the lower side of the tap-stem is supported, the remaining feed screw being disposed above and centrally between the aforesaid pair of screws and contacting with the upper side of the tap-stem, whereby the latter is supported at three substantially equi-distant points about its axis, and means for yieldingly urging the centrally disposed feed screw into peripheral contact with the tap-stem.

2. A nut tapping machine tool, comprising a frame, a tap having a comparatively long stem portion projecting from one end thereof, a plurality of spirally-fluted feed screws journaled in said frame and in frictional peripheral contact with substantially the overall length of the tap-stem, two of said feed screws being disposed side by side in horizontal alinement and between the upper opposing sides of which the lower side of the tap-stem is supported, the remaining feed screw being disposed above and centrally between the aforesaid pair of screws and contacting with the upper side of the tap-stem, whereby the latter is supported at three substantially equi-distant points about its axis, means for yeildingly urging the centrally-disposed feed screw into peripheral contact with the tap-stem, and jaws disposed forwardly of the feed screws and at opposite sides of the tap for holding the nuts against turning while being tapped.

PAUL C. RAYMOND.